US005561801A

United States Patent [19]
Simons et al.

[11] Patent Number: 5,561,801
[45] Date of Patent: Oct. 1, 1996

[54] SYSTEM AND METHOD FOR MULTILEVEL PROMOTION

[75] Inventors: Joshua E. Simons, Cambridge; James L. Frankel, Lexington, both of Mass.

[73] Assignee: Thinking Machines Corporation, Bedford, Mass.

[21] Appl. No.: 171,984

[22] Filed: Dec. 23, 1993

Related U.S. Application Data

[63] Continuation of Ser. No. 806,991, Dec. 13, 1991, abandoned.

[51] Int. Cl.⁶ .................................................. G06F 9/45
[52] U.S. Cl. ................... 395/700; 364/280.4; 364/280.5; 364/DIG. 1
[58] Field of Search .................... 395/700; 364/280.4, 364/280.5

[56] References Cited

U.S. PATENT DOCUMENTS

| | | | |
|---|---|---|---|
| 4,598,400 | 7/1986 | Hills | 370/60 |
| 4,773,038 | 9/1988 | Hillis et al. | 364/900 |
| 4,827,403 | 5/1989 | Steele, Jr. et al. | 364/200 |
| 4,984,235 | 1/1991 | Hillis et al. | 370/60 |
| 5,021,947 | 6/1991 | Campbell et al. | 364/200 |
| 5,083,265 | 1/1992 | Valiant | 395/800 |
| 5,093,914 | 3/1992 | Coplien et al. | 395/700 |
| 5,151,991 | 9/1992 | Iwasawa et al. | 359/700 |

OTHER PUBLICATIONS

John Rose et al., "C*: An Extended Language for Data Parallel Programming", TMC Technical Report Series, PL87-5 (Apr. 1987) (Presented at Second International Conference on Supercomputing, May 1987), 2–16.

Rose et al., C*: An Extended C Language for Data Parallel Programming, International Conference on Supercomputing, May 1987, pp. 2–16.

C* Reference Manual, Thinking Machines Corporation, Version 4.0A, pp. 44 and 45, (Aug. 1987).

C* Programming Guide, Thinking Machines Corporation, Version 6.0, (Contents pp. (i)–(xi), 43–50, 249–254, Nov. 1990.

Padua et al., "Advanced Compiler Optimizations for Supercomputers", Communications of the ACM, vol. 29, No. 12, Dec. 1986, pp. 1184–1201.

Ryder et al., Experiments in Optimizing FP, IEEE Trans. on Software Eng., vol. 14, No. 4, Apr. 1988, pp. 444–454.

*Primary Examiner*—Kevin A. Kriess
*Assistant Examiner*—Dennis M. Butler
*Attorney, Agent, or Firm*—Richard A. Jordan

[57] ABSTRACT

A compiler for compiling a computer program wherein the computer program is adapted for use with a data parallel computer. The compiler comprises a front end which generates a parse tree from a source code. In generating the parse tree, the front end coordinates the compilation of type conversion operations and promotion operations such that run-time efficiency is maximized. In other words, the front end compiles the type conversion operations and promotion operations in an order which maximizes run-time efficiency.

14 Claims, 6 Drawing Sheets

SYSTEM AND METHOD FOR MULTILEVEL PROMOTION

This application is a continuation, of application Ser. No. 07/806,991, filed Dec. 13, 1991, now abandoned.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following applications are assigned to the assignee of the present application:

U.S. patent application Ser. No. 07/042,761, filed Apr. 27, 1987, by W. Daniel Hillis, entitled "Method and Apparatus for Simulating M-Dimensional Connection Networks in an N-Dimensional Network Where M is Less Than N", incorporated herein by reference.

U.S. patent application Ser. No. 07/788,052, filed Nov. 5, 1991, by Frankel et al., entitled "A Compiler For Parallel Communication Instructions", incorporated herein by reference.

U.S. patent application Ser. No. 07/788,004, filed Nov. 5, 1991, by Frankel et al., entitled "System and Method For Parallel Variable Optimization", incorporated herein by reference.

U.S. patent application Ser. No. 07/788,003, filed Nov. 5, 1991, by Frankel et al., entitled "System and Method For Shape Selection and Contextualization", incorporated herein by reference.

INCORPORATION BY REFERENCE

U.S. Pat. No. 4,589,400, issued Jul. 1, 1986, to W. Daniel Hillis, for "Method and Apparatus for Routing Message Packets", and assigned to the assignee of the present application, incorporated herein by reference.

U.S. Pat. No. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to a system and method for compiling a computer program, and more particularly to a system and method for compiling a computer program wherein the computer program is adapted for use with a data parallel computer.

2. Related Art

A compiler is a computer program which receives a source program as input. The source program is written in a source language. The compiler translates the source program into an equivalent target program. The target program is written in a target language.

Many source and target languages are known. For example, source languages include Ada, Pascal, Fortran, C, and Lisp. Target languages include machine languages for computers having one or a great number of processors.

Compilers which support parallel data processing allow the definition and use of parallel variables. For reference purposes, such compilers are called data parallel compilers.

Many conventional compilers (both data parallel compilers and non-data parallel compilers) support type conversion operations wherein a value's data type is converted from a first data type (such as character) to a second data type (such as integer).

Some conventional data parallel compilers may also support promotion operations wherein scalar values are promoted to parallel values. Generally, however, such conventional data parallel compilers are flawed because they do not efficiently coordinate the compilation of type conversion operations and promotion operations.

Thus, a data parallel compiler which efficiently coordinates the compilation of type conversion operations and promotion operations is required.

SUMMARY OF THE INVENTION

The present invention is directed to a system and method for compiling a computer program, and more particularly to a compiler for compiling a computer program wherein the computer program is adapted for use with a data parallel computer.

The compiler comprises a front end which generates a parse tree from a source code. In generating the parse tree, the front end coordinates the compilation of type conversion operations and promotion operations such that run-time efficiency is maximized. In other words, the front end compiles the type conversion operations and promotion operations in an order which maximizes run-time efficiency.

The front end operates as follows according to a first embodiment. First, the front end locates a parallel instruction having a type conversion operation and a promotion operation. Then, the front end calculates (1) the cost of compiling the promotion operation before compiling the type conversion operation, and (2) the cost of compiling the type conversion operation before compiling the promotion operation. Then, the front end compiles the promotion operation before the type conversion operation if cost (1) is less than cost (2). Otherwise, the front end compiles the type conversion operation before the promotion operation.

According to a second embodiment, either the first alternative (that is, compiling the promotion operation before the type conversion operation) or the second alternative (that is, compiling the type conversion operation before the promotion operation) is selected. The front end then always operates according to the selected alternative.

The selected alternative is determined by performing computer simulations which yield run-time performance numbers regarding the first alternative and the second alternative. From these computer simulations, it is possible to empirically determine which alternative, on average, is more run-time efficient.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTIONS OF THE DRAWINGS

The present invention will be described with reference to the accompanying drawings, wherein.

DETAILED DESCRIPTION OF THE PREFERRED EMBODIMENTS

1. Hardware and Software Environment of the Present Invention

The present invention is directed to a software compiler for compiling a computer program wherein the computer program is adapted for use with a data parallel computer. In this patent document, the terms "computer program" and "source code" are used interchangeably.

In a preferred environment of the present invention, the data parallel computer is one manufactured by Thinking Machines Corporation, such as the Connection Machine® Model CM1™, CM2™ and CM5™ Supercomputers. These and other preferred environments of the present invention are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including one embodiment of processors and router, with which the present invention can be used. U.S. Pat. No. 4,984,235 describes a massively-parallel computer, including a second embodiment of processors. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating the 2-, 3-, or higher dimensional nearest-neighbor communication network ("NEWS") between chips using the hypercube wires.

The computer program is written in a high level language (HLL). A preferred HLL is C* (pronounced "see star"). C* is based on Standard C and is extended to support parallel instructions and parallel data types. The C* language is described in the Thinking Machines Corporation publication *C\* Programming Guide* (Version 6.0, November 1990) which is herein incorporated by reference in its entirety. The C* language is further described in the Thinking Machines Corporation publication *C\* Language Reference Manual* (April 1991) which is herein incorporated by reference in its entirety.

Figure 1A:
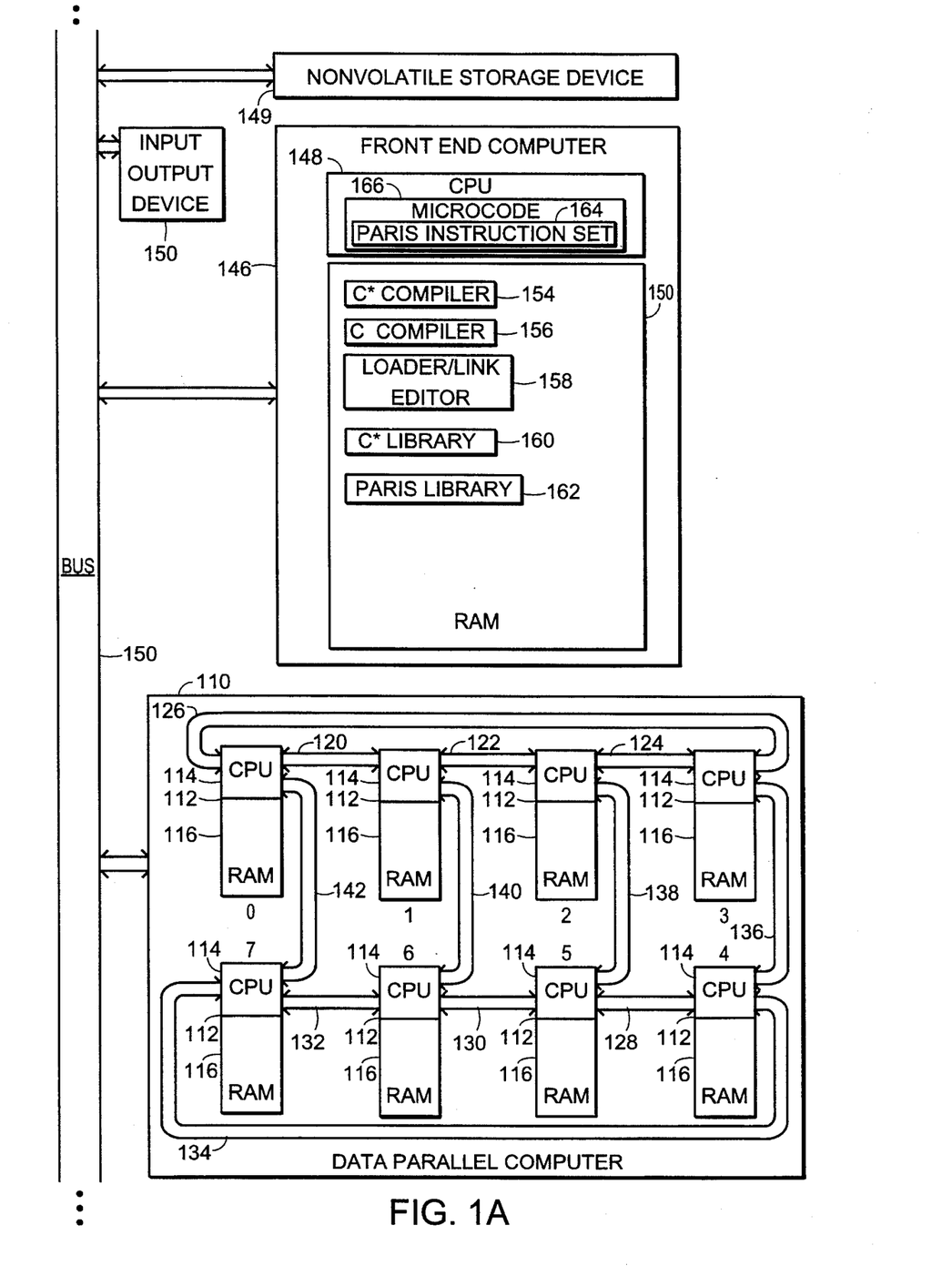
FIG. 1A shows a block diagram of a preferred environment in which the present invention could operate.

FIG. 1A shows a block diagram of the structure of a preferred environment in which the present invention could operate. A data parallel computer 110 is comprised of a plurality of parallel processors 112. The number of processors in an actual data parallel computer 110 might range from 2,048 to 65,536. For clarity, the data parallel computer 110 illustrated has only eight parallel processors 112 (parallel processor$_0$ to parallel processor$_7$). Each parallel processor 112 has a CPU 114 and a random access memory (RAM) 116.

Each of the parallel processors 112 is directly connected to three other parallel processors 112 by paths. For example, the parallel processor$_0$ 112 is directly connected to the parallel processor$_1$ 112 via a path 120, the processor$_3$ 112 via a path 126, and the parallel processor$_7$ 112 via a path 142. The direct connections are such that no more than two paths need be used to send data between nearest-neighbor parallel processors 112.

The data parallel computer 110 is electrically connected to a host computer 146, to a non-volatile storage device 149, and to an input/output device 150 via a bus 152.

The host computer 146 is a serial computer such as a Sun 4 (manufactured by Sun Microsystems, Inc.) or a VAX (manufactured by Digital Equipment Corp.). The host computer 146 comprises a single host CPU (or a small number of CPUs) 148 and a RAM 150.

The environment of The present invention further includes various software modules and a firmware module. The software components include a C compiler 156, a loader/link editor 158, a C* library 160, and a Paris library 162. The software modules could reside in the RAM 150, in the non-volatile storage device 149, or in some combination of the two. In FIG. 1A, the software modules are shown in the RAM 150. The firmware module (a Paris instruction set 164) resides in a microcode 166 of the host CPU 148.

A C* compiler 154 of the present invention is also included in the RAM 150. An example of the C* compiler 154 is the Thinking Machines Corporation C* Compiler, Version 6.0.

As noted above. C* is an extension of Standard C in that C* supports parallel instructions and parallel data types. Such extension of Standard C is achieved via use of a native instruction set of the data parallel computer. One such native instruction set is a Paris language. The Paris language is a low-level instruction set for programming the data parallel computer. The Paris language is described in the Thinking Machines Corporation documents *Paris Reference Manual* (Version 6.0, February 1991) and *Revised Paris Release Notes* (Version 6.0, February 1991), which are herein incorporated by reference in their entireties. These documents are available from the Thinking Machines Corporation Customer Support Department at 245 First Street, Cambridge, Mass.

The Paris instruction set 164 and the Paris library 162 implement the Paris language. The Paris instruction set 164 and the Paris library 162 are part of the system software for the Connection Machine® Model CM2™ Supercomputer.

Figure 2:
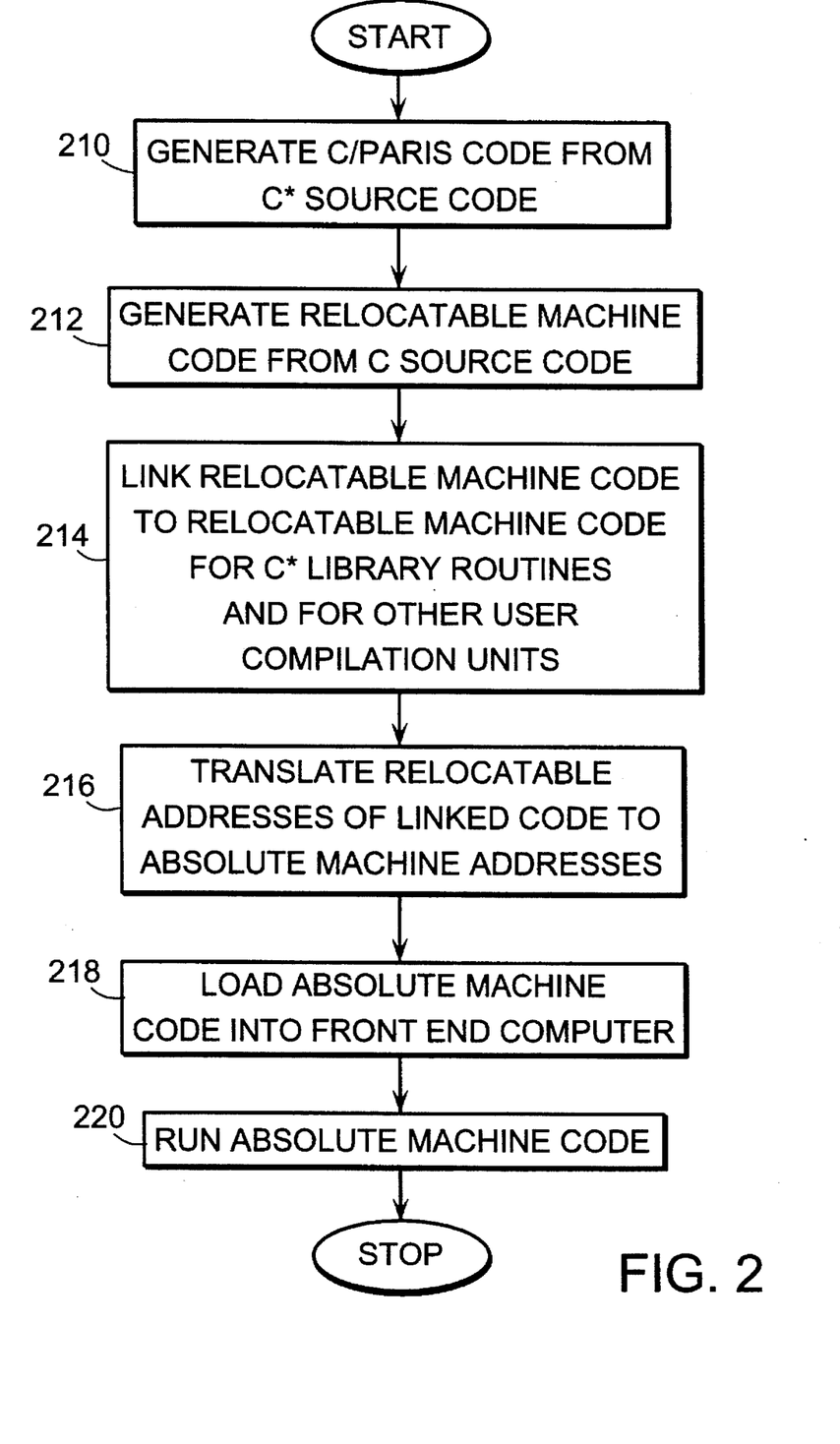
FIG. 2 is a flow chart which illustrates the relationship between software modules 154, 156, 158, 160 and 162 and firmware module 164 of FIG. 1A.

FIG. 2 is a flow chart which illustrates the relationship between the software modules 154, 156, 158, 160 and 162 and the firmware module 164 of FIG. 1A. Referring to FIG. 2, in a step 210 the C* compiler 154 generates C source code from C* source code. In a step 212, the C compiler 156 generates relocatable machine code from the C source code. In a step 214, the loader/link editor 158 links the relocatable machine code to user compilation units and to compilation units of the C* library 160 and the Paris library 162 to generate linked machine code. Steps 216, 218, and 220 involve executing the linked code. Specifically, in step 216, the relocatable addresses of the linked code are translated to absolute machine addresses. In step 218, the absolute machine code is loaded into the front end computer 146. In step 220, the absolute machine code is executed.

2. Selected Aspects of the C* Programming Language

C* uses shapes and parallel variables to extend C to support data parallel programming.

A shape is a template for parallel data. In C*, a programmer must specify the shape of the data before the programmer can define data of that shape. A shape is specified by how many dimensions it has and by the number of positions in each of its dimensions. The total number of positions in a shape is product of the number of positions in each of its dimensions. For example, an 8×4 shape has 32 positions.

A C* keyword "shape" is used to declare shapes. This is shown in Example 1, below.

```
shape [8]employees;          (Example 1)
shape [16]companies;
```

The statements in Example 1 declare a shape called employees and a shape called companies. The employees shape has one dimension (a rank of 1) and 8 positions. The companies shape has one dimension and 16 positions.

A dimension is also referred to as an axis. A shape can have multiple axes. Each of the axes are specified in a set of brackets to the left of the shape name. For example, the following statement in Example 2 declares a two-dimensional shape:

```
shape [256][512]image;       (Example 2)
```

The statement in Example 2 declares a shape called image. The shape image has two dimensions (a rank of 2), one of 256 positions and another of 512 positions. The left-most axis is referred to as axis 0. The next axis to the right is referred to as axis 1.

Parallel variables are similar to standard C variables. However, parallel variables have a shape in addition to their data type and storage classes. The shape defines how many elements of a parallel variable exists, and how they are organized. Each element occupies one position within the shape and contains a single value. If a shape has 16384 positions, for example, a parallel variable of that shape has 16384 elements—one for each position.

Parallel variables are declared as shown in Example 3.

```
double:employees employee_id;    (Example 3)
char:companies company_id;
```

In Example 3, employee_id is declared as a parallel variable having shape employees and type double. company_id is declared as a parallel variable having shape companies and type character.

Each element of a parallel variable can be thought of as a single scalar variable. But a C* program can also carry out operations on all elements (or any subset of the elements) of a parallel variable at the same time. Operations which operate on parallel variables are called parallel operations.

Once a parallel variable has been declared, left indexing may be used to specify an individual element of it. For example, [2]employee_id refers to the third element of employee_id. [2] is called the coordinate for this element.

Figure 1B:
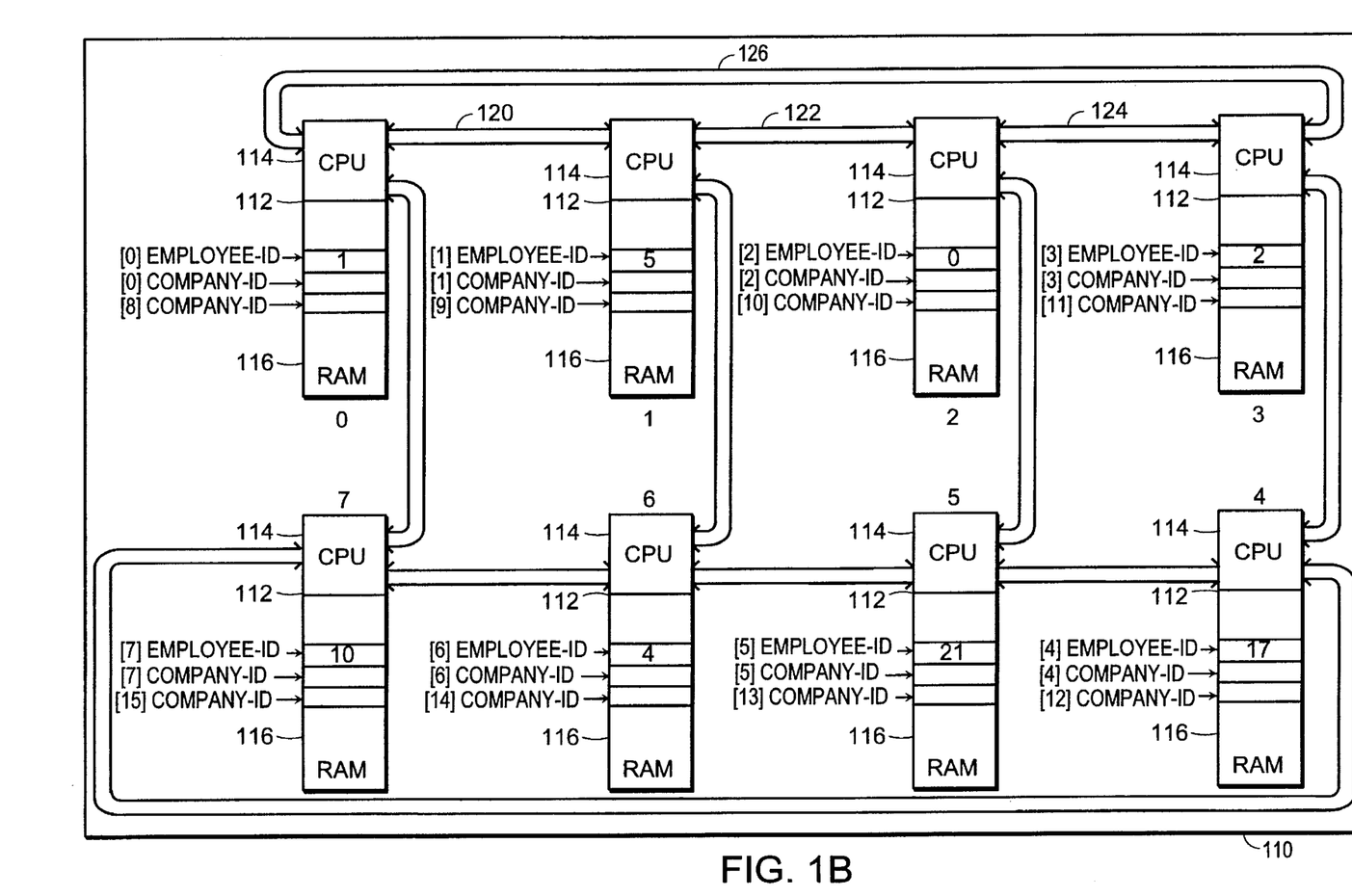
FIG. 1B illustrates a data parallel computer.

Elements of parallel variables are mapped to physical processors 112. This is illustrated in FIG. 1B. FIG. 1B illustrates the data parallel computer 110 in greater detail.

As shown in FIG. 1B, the first element of employee_id is mapped to the processor 0. The second element of employee_id is mapped to the processor 1. Similarly, the third, forth, fifth, sixth, seventh, and eight elements of employee_id are mapped to the processors 2, 3, 4, 5, 6 and 7, respectively.

In a similar manner, the elements of the parallel variable company_id are mapped to the processors 0–7. With regard to parallel variables of shape companies, note that each element does not map to a different physical processor. For example, both elements [0]company_id and [8]company_id map to physical processor 0. However, according to C*, all elements map to different virtual processors. Thus, for particular shapes, each physical processor may represent multiple virtual processors. For the shape companies, the number of virtual processors per physical processor is 2. For the shape employees, the number of virtual processors per physical processor is 1. This is called the virtual processor (VP) ratio.

Before a parallel operation may be executed on a parallel variable, the current shape must be set to the shape of the parallel variable. The current shape may be set by using the C* "with" statement. For example, to operate with parallel variables of shape employees (such as employee_id), the C* statements in Code Segment 1 may be used.

```
with(employees) {
    /* operations on parallel variables of
       shape employees go here */
};
Code Segment 1
```

Within the "with" statement of Code Segment 1, parallel operations may be performed on parallel variables of shape employees. However, parallel operations may not be performed on parallel variables (such as company_id), having other shapes (such as companies).

According to C*, parallel operations may be performed on a subset of the elements of a parallel variable. This is done using the C* "where" statement. The "where" statement restricts the context in which parallel operations are performed. A "where" statement specifies which positions in a shape remain active. Code in the body of a "where" statement applies only on elements in active positions.

For example, the C* statements in Code Segment 2, below, restrict parallel operations to positions of shape employees where the value of the parallel variable employee_id is greater than 6.

```
with(employees)
    where (employee_id > 6)
    /* parallel code in restricted context
       goes here */
Code Segment 2
```

The controlling expression that "where" evaluates to set the context must operate on a parallel variable of the current shape. The controlling expression evaluates to 0 (false) or non-zero (true) separately for each position. Positions in which the expression is false are made inactive. If no positions are active, code is still executed, but operations on the parallel variable of the current shape has no result. Initially, operations in all shapes are active.

Referring to FIG. 1B, for example, the "where" statement in Code Segment 2 evaluates to true for the employee_id elements in processors 4, 5 and 7. Therefore, as a result of the "where" statement in Code Segment 2, the employee_id elements in processors 4, 5 and 7 are active. The use of the "where" statement to make certain positions of a shape inactive and other positions of the shape active is called context manipulation.

C* supports promotion of scalar values to parallel variables. According to C*, programmers can use standard C binary operations when one of the operands is parallel and the other is scalar (the parallel variable must be of the current shape). In such cases, the scalar value is first promoted to a parallel value of the shape of the parallel operand, and this parallel value is used in the operation.

C* also supports type conversions. Both promotions and type conversions may be performed in the same instruction. Consider Code Segment 3, below.

---
1 char c;
2 employee_id = c;
Code Segment 3

---

Recall from Example 3 that employee_id was declared as a parallel variable having a shape employees and a type double. In code segment 3, c is declared as a scalar variable having a type character. Therefore, the assignment statement in line 2 of Code Segment 3 causes c to be promoted to a parallel variable having a shape employees and a type double. In other words, the assignment statement in line 2 of Code Segment 3 causes two operations to be performed. Specifically, a promotion of a scalar variable to a parallel variable is performed. Also, a type conversion from an original base type (that is, character) to a final base type (that is, double) is performed.

3. Overview of the C* Compiler

The general operation of the C* compiler is similar to the operation of conventional compilers. Such operation of conventional compilers are well known and are described in many publically available documents, such as *Compilers, Principles, Techniques, and Tools* by Aho, Sethi, and Ullman (Addison-Wesley Publishing Company, Reading Mass., 1988), which is herein incorporated by reference in its entirety.

As noted above, however, the C* source code 308 may include instructions involving parallel variables. The compilation of such parallel instructions are not well known. In compiling the C* source code 308, the C* compiler 154 replaces these parallel instructions with calls to functions in the Paris library 162.

Figure 3A:
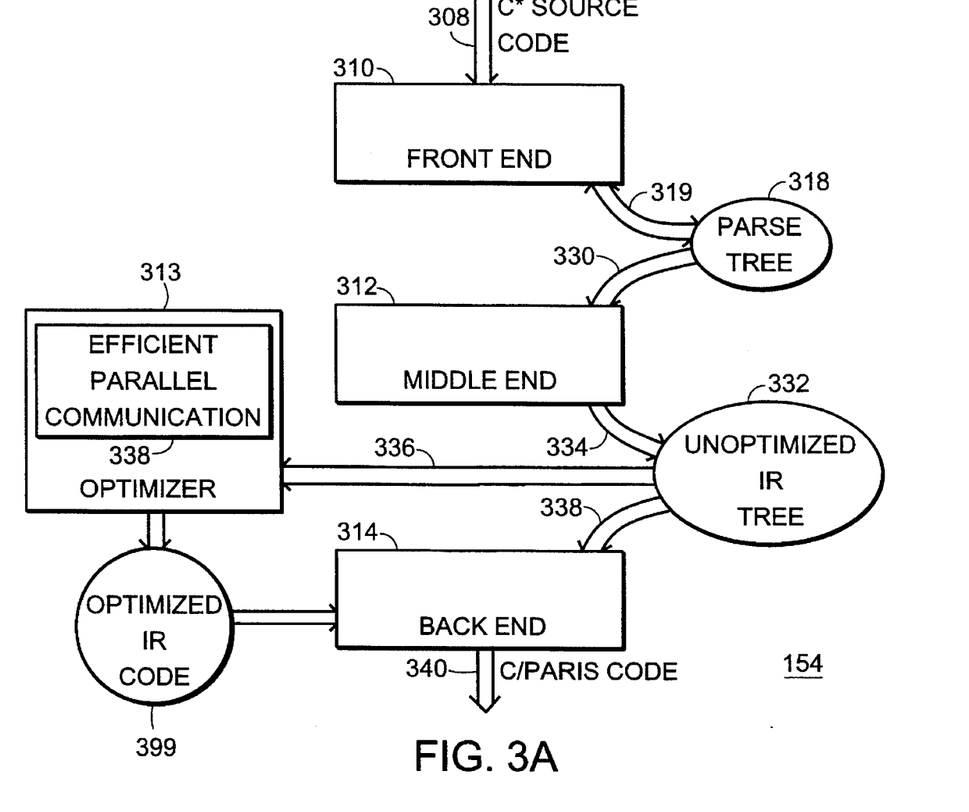
FIG. 3A is a high level block diagram of the structure of a C* compiler of the present invention.
Figure 3B:
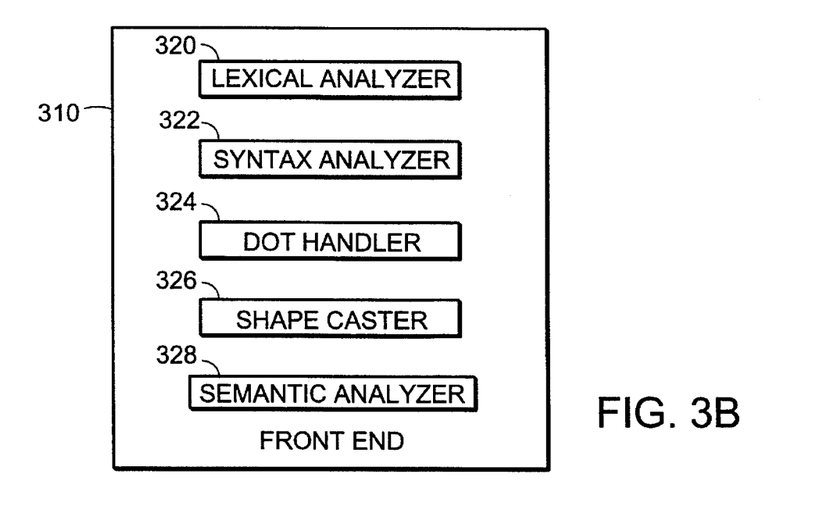
FIG. 3B illustrates the structure of a front end of the compiler of the present invention.

FIG. 3A is a high level block diagram of the structure of the C* compiler 154 of the present invention. As FIG. 3A shows, the C* compiler 154 is comprised of a front end 310, a middle end 314, an optimizer 313, and a back end 314. FIG. 3B illustrates the structure of the front end 310. The front end 310 includes a lexical analyzer 320, a syntax analyzer 322, a dot handler 324, a type caster 326 and a semantic analyzer 328.

Figure 4:
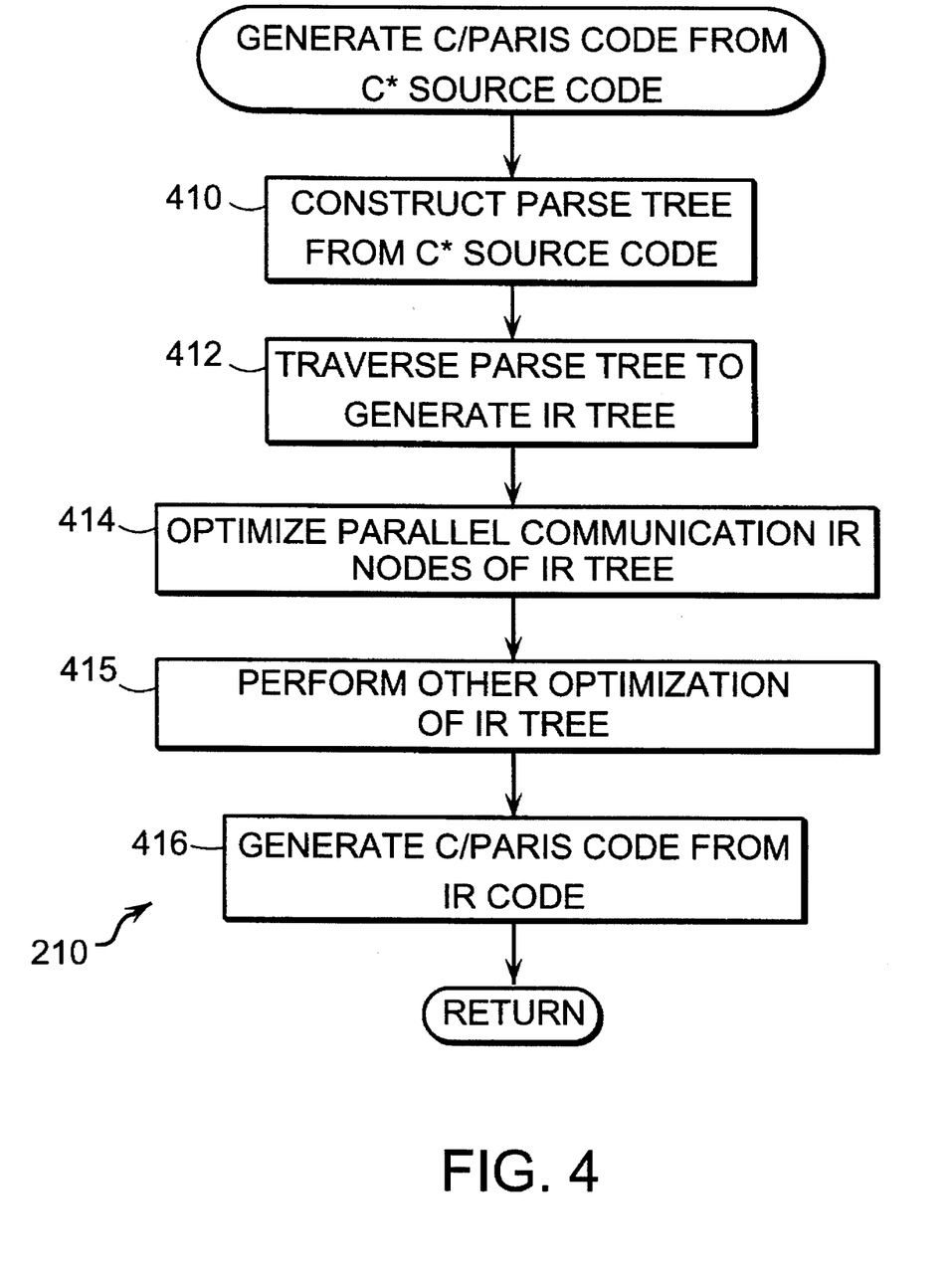
FIG. 4 is a flow chart which illustrates the interaction between modules of FIG. 3A.

FIG. 4 is a flow chart which illustrates the interaction between the modules of FIG. 3A. The flow chart of FIG. 4 also illustrates the detailed method of the step 210 of FIG. 2 of generating C source code from C* source code.

In a step 410, the front end 310 receives C* source code 308 and constructs a parse tree 318. Parse tree construction is carried out by the lexical analyzer 320, syntax analyzer 322, dot handler 324, type caster 326 and semantic analyzer 328.

In a step 412, the middle end 312 receives the parse tree 318 and generates an intermediate representation (IR) code 332. The IR code 332 is also called the IR tree 332. The IR code 332 contains calls to functions in the Paris library 1962. Note that the IR code 332 generated by the middle end 312 is unoptimized.

In a step 414, the IR code optimizer 313 optimizes the unoptimized IR code 332 received from the middle end 312 to produce optimized IR code 399. One aspect of the optimization is carried out by an efficient parallel communication module 338 of the optimizer 313. Specifically, the efficient grid communication module 338 replaces IR nodes which specify general parallel communication with IR nodes which specify grid communication where doing so is possible and would result in a more efficient communication. The structure and operation of the efficient grid communication module 338 is described in a pending patent application entitled "A Compiler For Parallel Communication Instructions", which was cited above.

In a step 415, the optimizer 313 performs other optimization, such as parallel variable optimization. Such optimization is described in a pending patent application entitled "System and Method For Parallel Variable Optimization", which was cited above.

The back end 314 receives either the unoptimized IR code 332 (from the middle end 312) or the optimized IR code 399 (from the optimizer 313). In a step 416, the back end 318 generates C source code. As noted above, the C source code contains calls to functions in the Paris library 162. Thus, the C source code is also called C/Paris source code.

4. System and Method for Multilevel Promotions

As noted above (see Code Segment 3 and the accompanying text), C* supports promotion of scalar variables to parallel variables. C* also supports type conversions.

As also noted above, the elements of parallel variables are mapped to physical processors. Therefore, a promotion of a scalar variable to a parallel variable can be viewed as a broadcast operation wherein the value of the scalar variable is broadcast to the processors in which the elements of the destination parallel variable are located. Consequently, the terms broadcast operation and promotion operation shall be used interchangeably in this patent document.

In compiling a parallel instruction which contains both a promotion operation and a type conversion operation (such as the assignment statement in line 2 of Code Segment 3), the front end 310 endeavors to achieve two goals. First, the front end attempts to make it explicit that the parallel instruction contains both a promotion operation and a type conversion operation. In other words, the front end 310 compiles the parallel instruction using at least two operations, wherein one of the operations is a promotion operation and another of the operations is a type conversion operation. By making it explicit that the parallel instruction contains both a promotion operation and a type conversion operation, the front end 310 facilitates the operation of the other portions of the compiler 154 (such as the middle end 312, optimizer 313, and back end 314).

In addition, the front end 310 attempts to optimize the parallel instruction with regard to the order in which the promotion operation and the type conversion operation are performed. In some instances, it is more efficient for the promotion operation to be executed before the type conversion operation. In other instances, it is more efficient for the type conversion operation to be executed before the promotion operation. According to the present invention, the front end 310 determines and uses the ordering which is most run-time efficient.

Figure 5:
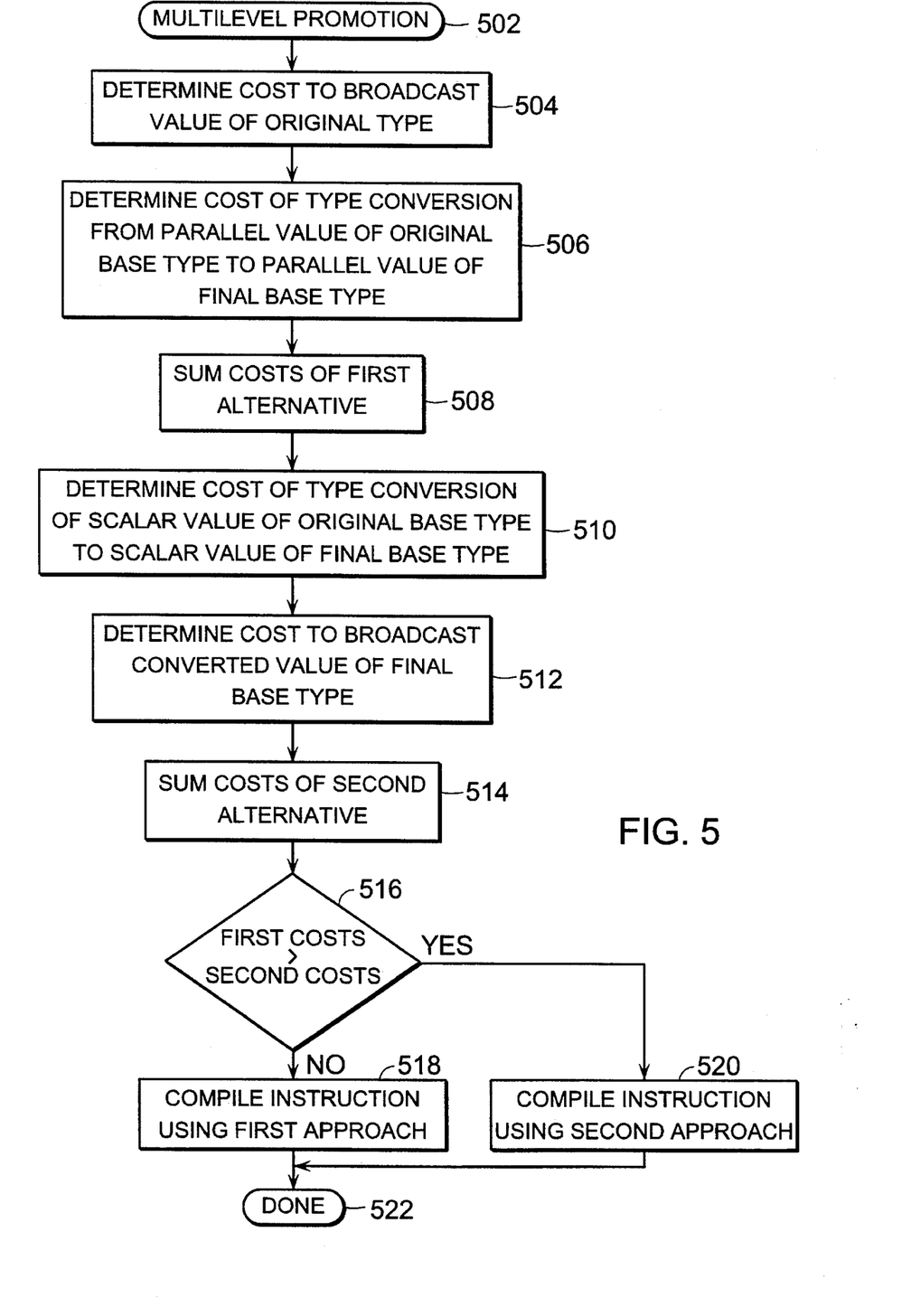
FIG. 5 illustrates the operation of the front end when the front end is compiling a parallel instruction which contains both a promotion operation and a type conversion operation.

FIG. 5 illustrates the operation of the front end 310 when the front end 310 is compiling a parallel instruction which contains both a promotion operation and a type conversion operation. According to the method shown in FIG. 5, the front end 310 determines and compares the cost of a first alternative and a second alternative. The front end 310 then selects and uses the alternative which has the lowest cost. Herein, the term "first alternative" refers to performing the broadcast operation and then performing the type conversion operation. The term "second alternative" refers to first performing the type conversion operation and then the broadcast operation.

According to the first alternative, the type conversion operation is performed by the processors 112 in the data parallel computer 110. This is the case since the scalar value is first broadcast from the front end computer 146 to the data parallel computer 110 before the type cast operation is performed.

According to the second alternative, the type conversion operation is performed by the front end computer 146. This is the case since the type conversion operation is performed before the broadcast operation is performed.

Referring now to FIG. 5, in steps 504, 506, and 508 the front end 310 determines the cost of the first alternative. Specifically, in step 504 the front end 310 determines the cost to broadcast a value of the original type. For example, referring to Code Segment 3, the front end 310 would determine the cost to broadcast a character value (associated with variable c) to the relevant processors (that is, the processors on which the elements of employee_id are mapped).

In step 506, the front end 310 determines the cost of performing a type conversion operation from a parallel value of the original base type to a parallel value of the final base type. For example, referring to Code Segment 3, in step 506, the front end 310 would determine the cost of performing a type conversion operation in the processors 112 from the character type (that is, the original base type) to the double type (that is, the final base type).

In step 508, the front end 310 sums the cost associated with the first alternative. In other words, the front end 310 sums the costs determined in step 504 and 506.

In steps 510, 512, and 514 the front end 310 determines the cost of the second alternative. Specifically, in step 510, the front end 310 determines the cost of a type conversion operation of a scalar value of the original base type to a scalar value of the final base type performed in the front end computer 146. For example, referring to Code Segment 3, the front end 310 in step 510 would determine the cost of a type conversion performed by the front end computer 146 from the character type (that is, the original base type) to the double type (that is, the final base type).

In step 512, the front end 310 determines the cost to broadcast the converted value of the final base type. For example, referring to Code Segment 3, the front end 310 in step 512 determines the cost to broadcast a value of the type double (that is, the final base type) to the relevant processors 112 (that is, the processors on which the elements of employee_id are mapped).

In step 514, the front end 310 sums the cost of the second alternative. In other words, the front end 310 sums the costs determined in steps 510 and 512.

In step 516, the front end 310 determines whether the costs associated with the first alternative are greater than the costs associated with the second alternative. If the costs associated with the first alternative are greater than the costs associated with the second alternative, then the front end 310 forms step 520. Otherwise, the front end performs step 518.

In step 520, the front end 310 compiles the parallel instruction containing both the promotion operation and the type conversion operation by first emitting a type conversion instruction and then emitting a broadcast instruction.

In step 518, the front end 310 compiles the parallel instruction containing both the promotion operation and the type conversion operation by first emitting a broadcast operation and then emitting a type conversion operation.

Note that such costs relating to type conversion operations and promotion operations are readily determined from the information which accompany specific processors. Ordinarily, this processor information specifies promotion operations and type conversion operations in terms of required machine cycles.

The operation of the front end 310 according to the method shown in FIG. 5 may be compile-time impractical since the flow chart in FIG. 5 must be performed by the front end 310 for every parallel instruction containing both a promotion operation and a type conversion operation. Therefore, according to a second embodiment of the present invention, either the first alternative or the second alternative is selected. The front end 310 then always operates according to the selected alternative.

The selected alternative is determined by performing computer simulations which yield run-time performance numbers regarding the first alternative and the second alternative. From these computer simulations, it is possible to empirically determine which alternative, on average, is more run-time efficient.

The first alternative may be advantageous since it broadcasts values of the original base type rather than values of the final base type. Thus, the first alternative is advantageous if the original base type is smaller than the final base type since it takes less time to transmit smaller values. However, the first alternative is not advantageous in this regard if the original base type is larger than the final base time.

The second alternative may be advantageous because the front end computer 146 may be more efficient at performing type conversion operations than the processors 112 of the data parallel computer 110.

The run-time efficiency of the first alternative decreases as the VP ratio increases. This is true because, with greater VP ratios, multiple iterations may be required to perform the type conversion operations on the processors 112 in the data parallel computer 110. Since the VP ratio is dependent on machine size (that is, the number of processors) and problem size (that is, the number of positions in shapes), the VP ratio cannot be determined at compile time. Thus, it is impossible to determine at compile time whether the VP ratio will adversely affect the run-time efficiency of the first alternative. In other words, it is impossible to determine at compile time the run-time efficiency of the first alternative.

In contrast, the run-time efficiency of the second alternative is not affected by the VP ratio. Thus, the second alternative is advantageous because, unlike the first alternative, its run-time efficiency may be more precisely determined at compile-time.

According to the preferred embodiment of the present invention, the front end 310 always operates according to the second alternative. In other words, in compiling parallel instructions containing both promotion operations and type conversion operations, the front end 310 always first emits a type conversion operation. Then, the front end 310 emits a promotion operation. The front end 310 operates in this manner because, according to the preferred embodiment, the front end computer 146 is more efficient at performing type conversion operations than the processors 112 in the data parallel computer 110.

Code Segments 4 and 5 illustrate the operation of the front end 310 with regard to compiling parallel instructions containing both promotion operations and type conversion operations. Code Segment 4 contains a C* source code 308. Code Segment 5 contains C/Paris code 340 which corresponds to the C* source code 308 in Code Segment 4.

Code Segment 4

```
1  main() {
2    shape [8192]S;
3    char c;
4    int x;
5    int:S i;
6    double:S d;
7
8    /* Implicit cast */
9    x = c;
10   i = c;
11   d = c;
12
13   /* Explicit cast */
14   x = (int) c;
15   i = (int:S) c;
16   d = (double:S) c;
17
18   /* Explicit casts: first type conversion then promotion */
19   i = (int:S)(int) c;
20   d = (double:S)(double) c;
21
22   /* Explicit casts: first promotion then type conversion */
23   i = (int:S)(char:S) c;
24   d = (double:S)(char:S) c;
25  }
```

Code Segment 5

```
1  #include <_CMC_types.h>
2  #include <_CMC_defs.h>
3
4  static char CMC_version[] = "C* Version 6.0.2 (60) for sun4";
5  int main();
6  int main()
7  {
8    CMC_Shape_t CMC_entry_shape =
         ((CMC_call_start_trap &&
9    CMC_start_trap()), CM_current_vp_set);
10   int CMC_s_temp_1;
11   double CMC_s_temp_2;
12   CMC_Shape_t S = allocate_shape(&S, 1, 8192);
13   char c,
14   int x;
15   CMC_Pvar_t i = CM_allocate_stack_field_vp_set(96, S);
16   CMC_Pvar_t d = CM_add_offset_to_field_id(i, 32);
17   x = (int )c;
18   CMC_s_temp_1 = (int )c;
19   CM_s_move_constant_1L(i, CMC_s_temp_1, 32);
20   CMC_s_temp_2 = (double )c;
21   CM_f_move_constant_1L(d, CMC_s_temp_2, 52, 11);
22   x = (int )c;
23   CMC_s_temp_1 = (int )c;
24   CM_s_move_constant_1L(i, CMC_s_temp_1, 32);
25   CMC_s_temp_2 = (double )c;
26   CM_f_move_constant_1L(d, CMC_s_temp_2, 52, 11);
27   CMC_s_temp_1 = (int )c;
28   CM_s_move_constant_1L(i, CMC_s_temp_1, 32);
29   CMC_s_temp_2 = (double )c;
30   CM_f_move_constant_1L(d, CMC_s_temp_2, 52, 11);
31   CMC_s_temp_1 = (int )c;
32   CM_s_move_constant_1L(i, CMC_s_temp_1, 32);
33   CMC_s_temp_2 = (double )c;
34   CM_f_move_constant_1L(d, CMC_s_temp_2, 52, 11);
35   CM_deallocate_stack_through(i);
36   if (S != CMC_no_vp_set)
37     deallocate_shape(&S);
38  }
39  static int CMC_start_trap()
40  {
41    CMC_Shape_t saved_shape =
         (CMC_init(), CM_current_vp_set);
42    CMC_call_start_trap = 0;
43
44    CM_set_vp_set(saved_shape);
45    return 0;
46  }
```

Copyright, Thinking Machines Corporation, 1991

Referring first to Code Segment 4, lines 9–11 contain implicit cast instructions. Lines 14–16 contain explicit cast instructions. Lines 19–20 contain explicit cast instructions wherein the programmer attempts to first perform type conversion and then perform promotion. Lines 23–24 contain explicit cast instructions wherein the programmer attempts to first perform promotion and then perform type conversion.

Line 17 in Code Segment 5 corresponds to line 9 in Code Segment 4. As shown in line 17 of Code Segment 5, the front end 310 has emitted a type conversion operation. Note that the line 9 in Code Segment 4 represents a scalar instruction having only a type conversion operation.

Lines 18 and 19 in Code Segment 5 correspond to line 10 in Code Segment 4. In compiling the parallel instruction in line 10 of Code Segment 4 (which contains both a promotion operation and a type conversion operation), the front end 310 first emitted a type conversion operation in line 18 of Code Segment 5 and then emitted a promotion operation in line 19 of Code Segment 5.

Lines 20 and 21 of Code Segment 5 correspond to line 11 of Code Segment 4. In compiling line 11 of Code Segment 4 (which contains both a promotion operation and a type conversion operation), the front end 310 first emitted a type conversion operation in line 20 of Code Segment 5 and then emitted a promotion operation in line 21 of Code Segment 5.

In compiling the instructions in lines 14–16, 19–20, and 23–24 of Code Segment 4, the front end 310 emitted the instructions in lines 22–26, 27–30, and 31–34. respectively, in Code Segment 5. The instructions in lines 22–26 are the same as the instructions in line 17–21. The instructions in lines 27–30 and 31–34 are the same as the instructions in lines 18–21. This illustrates that the front end 310 operates in the same manner for implicit cast operations, explicit cast operations, and explicit casts operations wherein the programmer attempts to perform the promotion operation before the type yconversion operation, or vice versa.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method for generating a target program from a source program, the source program written using a high level language supporting data parallel processing, the target program adapted for use in a data parallel computer, said computer implemented method comprising the steps of:

(1) locating in said source program a parallel instruction requiring performance of a type conversion operation involving a base type and a target type and a promotion operation;

(2) calculating a first run-time cost resulting from executing code generated by compiling said promotion operation, followed by executing code generated by compiling said type conversion operation;

(3) calculating a second run-time cost resulting from executing code generated by compiling said type conversion operation, followed by executing code generated by compiling said promotion operation; and (4) compiling said type conversion operation and said promotion operation to be executed in an order selected according to said first and second run-time costs to thereby generate the target program, such that an actual run-time cost of executing said compiled conversion and promotion operations is minimized.

2. The method of claim 1 in which the data parallel computer comprises a plurality of nodes for processing data in parallel, wherein step (2) comprises the steps of:
   (a) estimating a third run-time cost of executing a compiled instruction to transmit a value of the base type to the nodes of the data parallel computer;
   (b) estimating a fourth run-time cost of executing a compiled instruction to convert, in the nodes of the data parallel computer, a value from the base type to the target type; and
   (c) generating said first run-time cost as a function of said third and fourth run-time costs.

3. The method of claim 1 in which the data parallel computer comprises a plurality of nodes for processing data in parallel, wherein step (3) comprises the steps of:
   (a) estimating a third run-time cost of executing a compiled instruction to convert, in a scalar computer, a value from the base type to the target type;
   (b) estimating a fourth run-time cost of executing a compiled instruction to transmit a value of the target type to the nodes of the data parallel computer; and
   (c) generating said second run-time cost as a function of said third and fourth run-time costs.

4. The method of claim 1, wherein step (4) comprises the steps of:
   compiling said promotion operation and said type conversion operation such that said compiled promotion operation is executed before said compiled type conversion operation if said first run-time cost is less than said second run-time cost; and
   compiling said promotion operation and said type conversion operation such that said compiled type conversion operation is executed before said compiled promotion operation if said first run-time cost is greater than said second run-time cost.

5. A computer implemented method for generating a target program from a source program, the source program written using a high level language supporting data parallel processing, the target program adapted for use in a data parallel computer, said computer implemented method comprising the steps of:
   (1) empirically determining whether code generated in accordance with a first compilation method, wherein a promotion operation is compiled to be executed before a type conversion operation, is more run-time efficient than code generated in accordance with a second compilation method, wherein a type conversion operation is compiled to be executed before a promotion operation;
   (2) selecting said first compilation method if code generated in accordance with said first compilation method is more run-time efficient than code generated in accordance with said second compilation method as indicated by said empirical determination, and selecting said second compilation method if code generated in accordance with said second compilation method is more run-time efficient than code generated in accordance with said first compilation method as indicated by said empirical determination;
   (3) locating in said source program a parallel instruction requiring performance of a type conversion operation and a promotion operation; and
   (4) compiling said located parallel instruction in accordance with said selected compilation method to thereby generate the target program.

6. The method of claim 5, wherein step (2) comprises the step of selecting said first compilation method.

7. The method of claim 5, wherein step (2) comprises the step of selecting said second compilation method.

8. An apparatus for generating a target program from a source program, the source program written using a high level language supporting data parallel processing, the target program adapted for use in a data parallel computer, said apparatus comprising:
   a parser for locating in said source program a parallel instruction requiring performance of a type conversion operation involving a base type and a target type and a promotion operation;
   first run-time cost calculating means for calculating a first run-time cost resulting from executing code generated by compiling said promotion operation, followed by executing code generated by compiling said type conversion operation;
   second run-time cost calculating means for calculating a second run-time cost resulting from executing code generated by compiling said type conversion operation, followed by executing code generated by compiling said promotion operation; and
   compiling means for compiling said type conversion operation and said promotion operation to be executed in an order selected according to said first and second run-time costs to thereby generate the target program, such that an actual run-time cost of executing said compiled conversion and promotion operations is minimized.

9. The apparatus of claim 8 in which the data parallel computer comprises a plurality of nodes for processing data in parallel, said first run-time cost calculating means comprising:
   means for estimating a third run-time cost of executing a compiled instruction to transmit a value of the base type to the nodes of the data parallel computer;
   means for estimating a fourth run-time cost of executing a compiled instruction to convert, in the nodes of the data parallel computer, a value from the base type to the target type; and
   means for generating said first run-time cost as a function of said third run-time cost and said fourth run-time cost.

10. The apparatus of claim 8 in which the data parallel computer comprises a plurality of nodes for processing data in parallel, wherein said second run-time cost calculating means comprises:
   means for estimating a third run-time cost of executing a compiled instruction to convert, in a scalar computer, a value from the base type to the target type;
   means for estimating a fourth run-time cost of executing a compiled instruction to transmit a value of the target type to the nodes of the data parallel computer; and
   means for generating said second run-time cost as a function of said third run-time cost and said fourth run-time cost.

11. The apparatus of claim 8, wherein said compiling means comprises:
   means for compiling said promotion operation and said type conversion operation such that said compiled promotion operation is executed before said compiled type conversion operation if said first run-time cost is less than said second run-time cost; and means for compiling said promotion operation and said type conversion operation such that said compiled type conversion operation is executed before said compiled promotion operation if said first run-time cost is greater than said second run-time cost.

12. An apparatus for generating a target program from a source program, the source program written using a high level language supporting data parallel processing, the target program adapted for use in a data parallel computer, said apparatus comprising:

means for empirically determining whether code generated in accordance with a first compilation method, wherein a promotion operation is compiled to be executed before a type conversion operation, is more run-time efficient than code generated in accordance with a second compilation method, wherein a type conversion operation is compiled to be executed before a promotion operation;

means for selecting said first compilation method or said second compilation method in response to said empirical determination;

a parser for locating in said source program a parallel instruction requiring performance of a type conversion operation and a promotion operation; and     compiling means for compiling said located parallel instruction in accordance with said selected compilation method to thereby generate the target program.

13. A system for generating a target program from a source program, the source program written using a high level language supporting data parallel processing, the target program adapted for use in a data parallel computer, said system comprising:

A. a computer;

B. control means for controlling the computer, comprising:

(i) a parser for enabling said computer to locate in said source program a parallel instruction requiring performance of a type conversion operation involving a base type and a target type and a promotion operation;

(ii) first run-time cost calculating means for enabling said computer to calculate a first run-time cost resulting from executing code generated by compiling said promotion operation, followed by executing code generated by compiling said type conversion operation;

(iii) second run-time cost calculating means for enabling said computer to calculate a second run-time cost resulting from executing code generated by compiling said type conversion operation, followed by executing code generated by compiling said promotion operation; and     (iv) compiling means for enabling said computer to compile said type conversion operation and said promotion operation to be executed in an order selected according to said first and second run-time costs to thereby generate the target program, such that an actual run-time cost of executing said compiled conversion and promotion operations is minimized.

14. A control subsystem arrangement for controlling a computer to generate a target program from a source program, the source program written using a high level language supporting data parallel processing, the target program adapted for use in a data parallel computer, said control subsystem arrangement comprising:

a parser for enabling the computer to locate in said source program a parallel instruction requiring performance of a type conversion operation involving a base type and a target type and a promotion operation;

first run-time cost calculating means for enabling the computer to calculate a first run-time cost resulting from executing code generated by compiling said promotion operation, followed by executing code generated by compiling said type conversion operation;

second run-time cost calculating means for enabling the computer to calculate a second run-time cost resulting from executing code generated by compiling said type conversion operation, followed by executing code generated by compiling said promotion operation; and     compiling means for enabling the computer to compile said type conversion operation and said promotion operation to be executed in an order selected according to said first and second run-time costs to thereby generate the target program, such that an actual run-time cost of executing said compiled conversion and promotion operations is minimized.

\* \* \* \* \*